US012417672B2

(12) United States Patent
Crivelli

(10) Patent No.: US 12,417,672 B2
(45) **Date of Patent: *Sep. 16, 2025**

(54) COMMUNITY GAMING EXPERIENCE

(71) Applicant: IGT, Las Vegas, NV (US)

(72) Inventor: Franco E. Crivelli, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,789

(22) Filed: Jun. 25, 2024

(65) Prior Publication Data

US 2024/0346881 A1 Oct. 17, 2024

Related U.S. Application Data

(63) Continuation of application No. 17/032,785, filed on Sep. 25, 2020, now Pat. No. 12,067,837, which is a continuation of application No. 15/342,854, filed on Nov. 3, 2016, now abandoned, which is a continuation of application No. 13/707,504, filed on Dec. 6, 2012, now Pat. No. 9,489,801.

(51) Int. Cl.
*G07F 17/32* (2006.01)
*G07F 17/34* (2006.01)

(52) U.S. Cl.
CPC ...... *G07F 17/3244* (2013.01); *G07F 17/3211* (2013.01); *G07F 17/3272* (2013.01); *G07F 17/329* (2013.01); *G07F 17/3293* (2013.01); *G07F 17/34* (2013.01)

(58) Field of Classification Search
CPC ............. G07F 17/3211; G07F 17/3244; G07F 17/3272; G07F 17/329; G07F 17/3293; G07F 17/34
See application file for complete search history.

(56) References Cited

U.S. PATENT DOCUMENTS 6,149,522 A 11/2000 Alcorn et al.
6,159,095 A 12/2000 Frohm et al.
6,179,711 B1 1/2001 Yoseloff
6,203,428 B1 3/2001 Giobbi et al.
6,203,429 B1 3/2001 Demar et al.
(Continued)

FOREIGN PATENT DOCUMENTS

WO 9609102 A1 3/1996
WO 9719736 A1 6/1997
(Continued)

*Primary Examiner* — Chase E Leichliter
(74) *Attorney, Agent, or Firm* — Neal, Gerber & Eisenberg LLP

(57) ABSTRACT

A gaming environment may provide a user with a community gaming experience by providing, via a first interface at a first gaming machine, a display of a wagering game to a first player; determining an initial game outcome for a play of the wagering game by the first player, wherein the initial game outcome is a losing game outcome; based on the losing game outcome by the first player, receiving, from a second player, a selection of an option to wager on a final game outcome, the final game outcome being based in part on the losing game outcome; displaying, via a second interface at a second gaming machine, the final game outcome to the second player; and providing an award to the second player based on the final game outcome.

12 Claims, 7 Drawing Sheets

(56) References Cited

U.S. PATENT DOCUMENTS

| | | | | |
|---|---|---|---|---|
| 6,210,277 | B1 | 4/2001 | Stefan | |
| 6,227,969 | B1 | 5/2001 | Yoseloff | |
| 6,237,916 | B1 | 5/2001 | Webb | |
| 6,254,481 | B1 | 7/2001 | Jaffe | |
| 6,264,561 | B1 | 7/2001 | Saffari et al. | |
| 6,270,411 | B1 | 8/2001 | Gura et al. | |
| 6,290,600 | B1 | 9/2001 | Glasson | |
| 6,334,814 | B1 | 1/2002 | Adams | |
| 6,336,857 | B1 | 1/2002 | Mcbride | |
| 6,358,146 | B1 | 3/2002 | Adams | |
| 6,394,902 | B1 | 5/2002 | Glavich et al. | |
| 6,394,907 | B1 | 5/2002 | Rowe | |
| 6,398,645 | B1 | 6/2002 | Yoseloff | |
| 6,419,579 | B1 | 7/2002 | Bennett | |
| 6,425,823 | B1 | 7/2002 | Byrne | |
| 6,443,841 | B1 | 9/2002 | Rossides | |
| 6,511,068 | B1 | 1/2003 | Sklansky et al. | |
| 6,517,073 | B1 | 2/2003 | Vancura | |
| 6,520,856 | B1 | 2/2003 | Walker et al. | |
| 6,523,829 | B1 | 2/2003 | Walker et al. | |
| 6,561,904 | B2 | 5/2003 | Locke et al. | |
| 6,607,195 | B2 | 8/2003 | Vancura | |
| 6,652,378 | B2 | 11/2003 | Cannon et al. | |
| 6,656,040 | B1 | 12/2003 | Brosnan et al. | |
| 6,656,044 | B1 | 12/2003 | Lewis | |
| 6,663,488 | B1 | 12/2003 | Adams | |
| 6,679,497 | B2 | 1/2004 | Walker et al. | |
| 6,685,567 | B2 | 2/2004 | Cockerille et al. | |
| 6,692,003 | B2 | 2/2004 | Potter et al. | |
| 6,695,696 | B1 | 2/2004 | Kaminkow | |
| 6,702,289 | B1 | 3/2004 | Feola | |
| 6,712,699 | B2 | 3/2004 | Walker et al. | |
| 6,726,565 | B2 | 4/2004 | Hughs-baird | |
| 6,746,328 | B2 | 6/2004 | Cannon et al. | |
| 6,789,801 | B2 | 9/2004 | Snow | |
| 6,793,578 | B2 | 9/2004 | Luccesi et al. | |
| 6,804,763 | B1 | 10/2004 | Stockdale et al. | |
| 6,827,646 | B2 | 12/2004 | Adams | |
| 6,846,238 | B2 | 1/2005 | Wells | |
| 6,863,608 | B1 | 3/2005 | Lemay et al. | |
| 6,866,586 | B2 | 3/2005 | Oberberger et al. | |
| 6,994,624 | B2 | 2/2006 | Gold et al. | |
| 7,029,395 | B1 | 4/2006 | Baerlocher | |
| 7,111,845 | B2 | 9/2006 | Walker et al. | |
| 7,201,654 | B1 | 4/2007 | Jarvis et al. | |
| 7,226,358 | B2 | 6/2007 | Miller et al. | |
| 7,329,179 | B2 | 2/2008 | Baerlocher | |
| 7,351,146 | B2 | 4/2008 | Kaminkow | |
| 7,393,278 | B2 | 7/2008 | Gerson et al. | |
| 7,425,177 | B2 | 9/2008 | Rodgers et al. | |
| 7,427,236 | B2 | 9/2008 | Kaminkow et al. | |
| 7,429,215 | B2 | 9/2008 | Rozkin et al. | |
| 7,503,849 | B2 | 3/2009 | Hornik et al. | |
| 7,594,851 | B2 | 9/2009 | Falconer | |
| 7,775,873 | B2 * | 8/2010 | Aoki | G07F 17/3267 463/16 |
| 7,837,554 | B2 | 11/2010 | Kaminkow et al. | |
| 7,841,939 | B2 | 11/2010 | Baerlocher et al. | |
| 7,931,531 | B2 | 4/2011 | Oberberger | |
| 7,980,948 | B2 | 7/2011 | Rowe et al. | |
| 8,298,066 | B2 * | 10/2012 | Kelly | G07F 17/32 463/20 |
| 8,403,737 | B1 | 3/2013 | Friedman | |
| 8,475,254 | B2 * | 7/2013 | Acres | G07F 17/32 463/19 |
| 8,535,156 | B2 * | 9/2013 | Roireau | G07F 17/3225 463/25 |
| 8,602,865 | B2 * | 12/2013 | Zielinski | G07F 17/32 463/16 |
| 8,777,720 | B2 * | 7/2014 | Kelly | G07F 17/34 463/20 |
| 8,821,239 | B1 | 9/2014 | Chun | |
| 9,142,097 | B2 * | 9/2015 | Rowe | G07F 17/32 |
| 9,489,801 | B2 * | 11/2016 | Crivelli | G07F 17/3293 |
| 9,530,283 | B2 * | 12/2016 | Acres | G07F 17/34 |
| 12,067,837 | B2 * | 8/2024 | Crivelli | G07F 17/329 |
| 2002/0037762 | A1 | 3/2002 | Wood et al. | |
| 2002/0045474 | A1 | 4/2002 | Singer et al. | |
| 2002/0094869 | A1 | 7/2002 | Harkham | |
| 2002/0142825 | A1 | 10/2002 | Lark et al. | |
| 2003/0060268 | A1 | 3/2003 | Falconer | |
| 2003/0073497 | A1 | 4/2003 | Nelson | |
| 2003/0144053 | A1 | 7/2003 | Michaelson | |
| 2003/0199312 | A1 | 10/2003 | Walker et al. | |
| 2003/0203756 | A1 | 10/2003 | Jackson | |
| 2003/0224852 | A1 * | 12/2003 | Walker | G07F 17/3276 463/20 |
| 2004/0002379 | A1 | 1/2004 | Parrott et al. | |
| 2004/0063492 | A1 | 4/2004 | Baerlocher et al. | |
| 2004/0070146 | A1 | 4/2004 | Snow | |
| 2004/0072619 | A1 | 4/2004 | Brosnan et al. | |
| 2004/0082384 | A1 * | 4/2004 | Walker | G07F 17/3239 463/40 |
| 2004/0084843 | A1 | 5/2004 | Snow | |
| 2004/0090003 | A1 | 5/2004 | Snow | |
| 2004/0090005 | A1 | 5/2004 | Snow | |
| 2004/0106446 | A1 | 6/2004 | Cannon et al. | |
| 2004/0147314 | A1 | 7/2004 | Lemay et al. | |
| 2004/0152509 | A1 | 8/2004 | Hornik et al. | |
| 2004/0204235 | A1 | 10/2004 | Walker et al. | |
| 2005/0003886 | A1 | 1/2005 | Englman et al. | |
| 2005/0085288 | A1 | 4/2005 | Schugar et al. | |
| 2005/0192099 | A1 | 9/2005 | Nguyen et al. | |
| 2005/0233803 | A1 | 10/2005 | Yang | |
| 2005/0239542 | A1 | 10/2005 | Olsen | |
| 2006/0040732 | A1 | 2/2006 | Baerlocher et al. | |
| 2006/0073882 | A1 | 4/2006 | Rozkin et al. | |
| 2006/0073884 | A1 * | 4/2006 | Walker | G07F 17/3288 463/25 |
| 2006/0079318 | A1 * | 4/2006 | Aoki | G07F 17/3223 463/20 |
| 2006/0128457 | A1 | 6/2006 | Cannon | |
| 2006/0211473 | A1 | 9/2006 | Walker et al. | |
| 2006/0247010 | A1 | 11/2006 | Gagner | |
| 2006/0247011 | A1 | 11/2006 | Gagner | |
| 2006/0247029 | A1 | 11/2006 | Walker et al. | |
| 2007/0054726 | A1 | 3/2007 | Muir et al. | |
| 2007/0060254 | A1 * | 3/2007 | Muir | G07F 17/3244 463/16 |
| 2007/0060314 | A1 | 3/2007 | Baerlocher et al. | |
| 2007/0060321 | A1 | 3/2007 | Vasquez et al. | |
| 2007/0102877 | A1 | 5/2007 | Personius et al. | |
| 2007/0155482 | A1 | 7/2007 | Walker et al. | |
| 2007/0155483 | A1 | 7/2007 | Walker et al. | |
| 2007/0155484 | A1 | 7/2007 | Walker et al. | |
| 2007/0167211 | A1 | 7/2007 | Rodgers et al. | |
| 2007/0191088 | A1 | 8/2007 | Breckner et al. | |
| 2007/0243925 | A1 | 10/2007 | Lemay et al. | |
| 2007/0273097 | A1 | 11/2007 | Kirkutis | |
| 2007/0293293 | A1 | 12/2007 | Baerlocher et al. | |
| 2008/0009340 | A1 * | 1/2008 | Walker | G07F 17/32 463/25 |
| 2008/0009341 | A1 * | 1/2008 | Walker | G07F 17/3237 463/25 |
| 2008/0067745 | A1 | 3/2008 | Wikstrom | |
| 2008/0076496 | A1 | 3/2008 | Baerlocher et al. | |
| 2008/0076531 | A1 | 3/2008 | Baerlocher et al. | |
| 2008/0076532 | A1 | 3/2008 | Graham et al. | |
| 2008/0076542 | A1 | 3/2008 | Iddings et al. | |
| 2008/0108401 | A1 | 5/2008 | Baerlocher et al. | |
| 2008/0108425 | A1 | 5/2008 | Oberberger | |
| 2008/0146344 | A1 | 6/2008 | Rowe et al. | |
| 2009/0042644 | A1 | 2/2009 | Zielinski | |
| 2009/0042645 | A1 | 2/2009 | Graham et al. | |
| 2009/0111574 | A1 | 4/2009 | Rowe | |
| 2009/0117993 | A1 | 5/2009 | Bigelow et al. | |
| 2009/0325686 | A1 | 12/2009 | Davis et al. | |
| 2010/0120486 | A1 * | 5/2010 | DeWaal | G07F 17/32 463/43 |
| 2010/0285860 | A1 | 11/2010 | Svanas | |
| 2011/0065493 | A1 * | 3/2011 | Parham | G07F 17/3281 463/20 |

(56) References Cited

U.S. PATENT DOCUMENTS

| | | | | |
|---|---|---|---|---|
| 2012/0157212 | A1 | 6/2012 | Kane et al. | |
| 2013/0260861 | A1* | 10/2013 | Vann | G07F 17/34 463/20 |
| 2014/0024437 | A1* | 1/2014 | Vann | G07F 17/3279 463/25 |
| 2014/0162761 | A1* | 6/2014 | Crivelli | G07F 17/34 463/25 |
| 2017/0076545 | A1* | 3/2017 | Crivelli | G07F 17/3244 |
| 2021/0082243 | A1* | 3/2021 | Crivelli | G07F 17/3272 |
| 2024/0346881 | A1* | 10/2024 | Crivelli | G07F 17/329 |

FOREIGN PATENT DOCUMENTS

| | | | |
|---|---|---|---|
| WO | 9727570 | A1 | 7/1997 |
| WO | 9910849 | A1 | 3/1999 |
| WO | 02099760 | A2 | 12/2002 |

* cited by examiner

COMMUNITY GAMING EXPERIENCE

PRIORITY CLAIM

This application is a continuation of, claims priority to and the benefit of U.S. patent application Ser. No. 17/032,785, filed on Sep. 25, 2020, which is a continuation of, claims priority to and the benefit of U.S. patent application Ser. No. 15/342,854, filed on Nov. 3, 2016, which is continuation of, claims priority to and the benefit of U.S. patent application Ser. No. 13/707,504, filed on Dec. 6, 2012, the entire contents of which are each incorporated by reference herein.

BACKGROUND

Many of today's gaming casinos and other entertainment locations feature different single and multi-player gaming systems such as slot machines and video poker machines. The gaming machines may include a number of hardware and software components to provide a wide variety of game types and game playing capabilities. Exemplary hardware components may include bill validators, coin acceptors, card readers, keypads, buttons, levers, touch screens, coin hoppers, ticket printers, player tracking units and the like. Software components may include, for example, boot and initialization routines, various game play programs and subroutines, credit and payout routines, image and audio generation programs, various component modules and a random or pseudo-random number generator, among others.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personnel (e.g., gaming control personnel) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

In many casinos and other entertainment locations, the gaming machines may be networked to one or more devices that monitor the functions of the gaming machines during operation. For example, a system may monitor and regulate the amount of money received by a gaming machine and the amount of money paid out by the gaming machine. The system may also monitor and regulate multi-player gaming, pooling of player wagers, etc. on the gaming machine. For example, networking and/or control software may be used to regulate game performance across all players, such as graphics that allows each player to participate in the same scene in the game. Networking and/or control software may be used to unify separate gaming machines such that the multi-player gaming may appear as one game to the system. Networking may also allow two or more gaming machines to be combined under the same model, which allows several players to play the same game, while at different gaming machines.

The gaming industry strives to develop and retain the most entertaining games to attract users. For example, a gaming enhancement that attracts increased play includes the concept of a "community" game. The "community" game may be a secondary or bonus game that may be played in conjunction with a "primary" game, such as a side wager. The community game may include any type of game that is similar to the primary game, which is entered into based upon a selected event or outcome in the primary game. The community game may include a progressive jackpot award that is funded by a percentage of coin-in from the gaming machine or a plurality of gaming machines.

SUMMARY

According to various example embodiments, a method for providing a community gaming experience is disclosed. The method may include providing, via a first interface at a first gaming machine, a display of a wagering game to a first player. The method may also include determining an initial game outcome for a play of the wagering game by the first player, wherein the initial game outcome is a losing game outcome. The method may yet further include, based on the losing game outcome by the first player, receiving, from a second player, a selection of an option to wager on a final game outcome, the final game outcome being based in part on the losing game outcome. The method may include displaying, via a second interface at a second gaming machine, the final game outcome to the second player. The method may yet further include providing an award to the second player based on the final game outcome.

According to one example embodiment, a controller is disclosed. The controller includes a processor configured to execute a first and a second interface. The processor may also be configured to provide, via the first interface at a first gaming machine, a display of a wagering game to a first player. The processor may be configured to determine an initial game outcome for a play of the wagering game by the first player, wherein the initial game outcome is a losing game outcome. Based on the losing game outcome by the first player, the processor may be further configured to receive, from a second player, a selection of an option to wager on a final game outcome, the final game outcome being based in part on the losing game outcome. The processor may also be configured to display, via the second interface at a second gaming machine, the final game outcome to the second player. The processor may also be configured to provide an award to the second player based on the final game outcome.

According to another example embodiment, a computer-readable storage medium is disclosed. The storage medium has machine instructions stored therein, the instructions being executable by a processor to cause the processor to perform operations. The operations include providing, via a first interface at a first gaming machine, a display of a wagering game to a first player. The operations may also include determining an initial game outcome for a play of the wagering game by the first player, wherein the initial game outcome is a losing game outcome. The operations may further include, based on the losing game outcome by the first player, receiving, from a second player, a selection of an option to wager on a final game outcome, the final game outcome being based in part on the losing game outcome. The operations may also include displaying, via a second interface at a second gaming machine, the final game outcome to the second player. The operations may include providing an award to the second player based on the final game outcome.

BRIEF DESCRIPTION OF THE DRAWINGS

The details of one or more implementations are set forth in the accompanying drawings and the description below.

Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

In a primary game, a first player may achieve a near miss for an award on a gaming machine. For example, the first player may receive four out of five "7" symbols on a slot wagering game, four out of five cards toward a royal flush on a poker wagering game, seven out of eight spots on a keno wagering game, etc. When the player achieves the near miss, a second player may be given the opportunity to assist the first player to win the award. For example, the second player may spin a reel, draw a card, draw a ball, etc. to fill in the missing symbol, card, spot, etc.

The second player may receive a portion of the award if the second player's assistance leads to a winning award. The award may be any type of award that provides credit to the first player.

Figure 1:
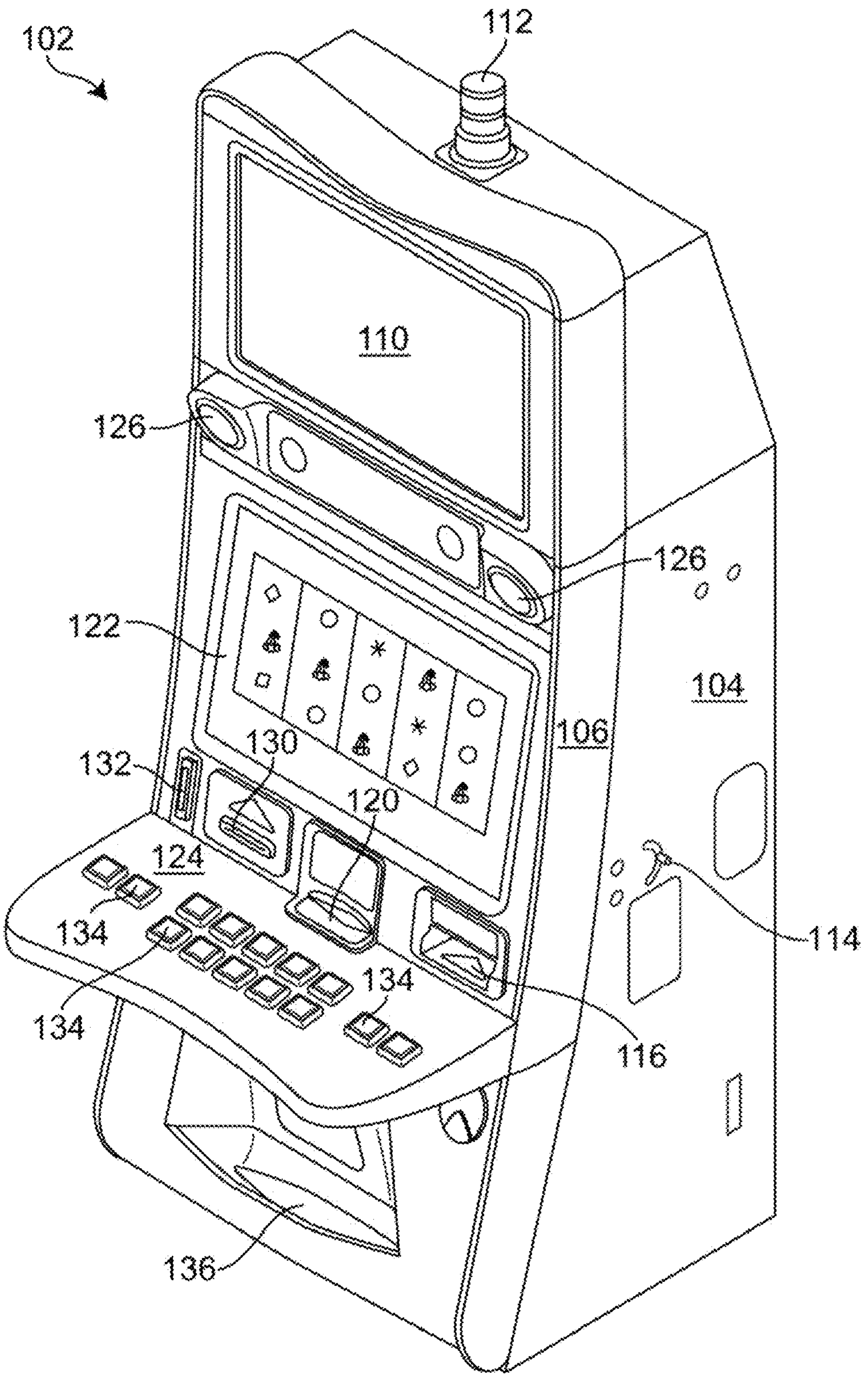
FIG. 1 is an illustration of a gaming machine, according to an exemplary embodiment.

Referring to FIG. 1, a perspective drawing of an electronic gaming machine 102 is shown in accordance with described embodiments. Gaming machine 102 may include a main cabinet 104. Main cabinet 104 may provide a secure enclosure that prevents tampering with device components, such as a game controller (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include a first electronic display 110, a second electronic display 122, speakers 126, and/or a candle device 112 to convey information to the user of gaming machine 102. Gaming machine 102 may also include a console 124 having one or more inputs 134 (e.g., buttons, track pads, etc.) configured to receive input from a user. A controller (not shown) within gaming machine 102 may run a game, such as a wager-based game, in response to receiving input from a user via inputs 134 or displays 110, 122. For example, inputs 134 may be operated to place a wager in the game and to run the game. In response, the controller may cause reels shown on display 122 to spin, such as with a slot game, and/or display 110 to display the results of the game.

Gaming machine 102 may also include devices for conducting a wager-based game. For example, gaming machine 102 may include a ticket acceptor 116 and a printer 120. In various embodiments, gaming machine 102 may be configured to run on credits that may be redeemed for money and/or other forms of prizes. Ticket acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In one embodiment, gaming machine 102 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, a free room upgrade, discounts, etc.).

Figure 2:
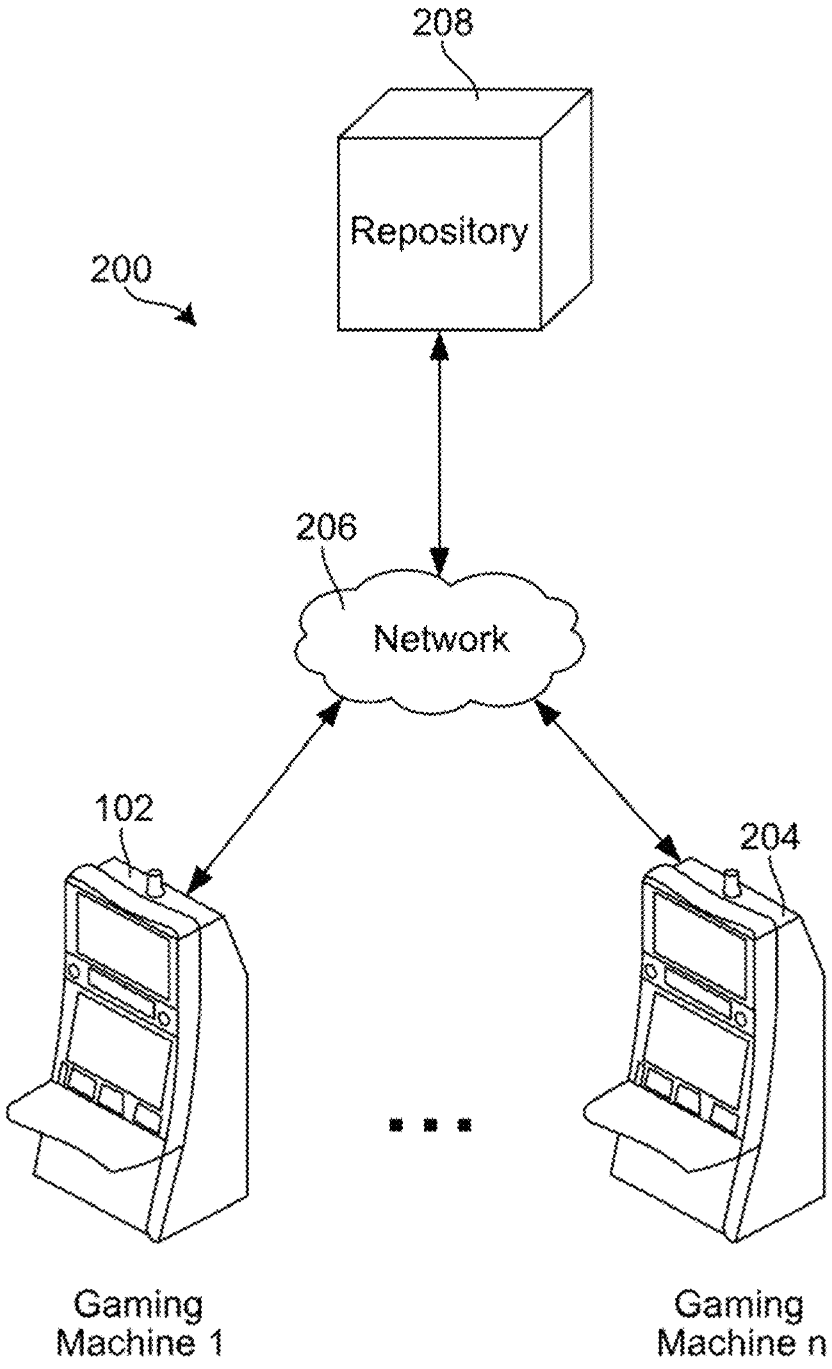
FIG. 2 is an illustration of a gaming environment, according to an exemplary embodiment.

Referring now to FIG. 2, an illustration of a gaming environment 200 is shown, according to an exemplary embodiment. Gaming environment 200 may be within, for example, a casino, a racetrack, a hotel, or other entertainment location. As shown, gaming environment 200 may include any number of gaming machines. For example, gaming environment 200 may include gaming machine 102 shown in FIG. 1 through a gaming machine 204 (i.e., a first gaming machine through nth gaming machine). Gaming environment may also include a network 206 through which gaming machines 102, 204 communicate with a repository 208. In some embodiments, gaming machines 102, 204 may also communicate with each other via network 206.

Network 206 may be any form of communications network that conveys data between gaming machines 102, 204 and repository 208. Network 206 may include any number wired or wireless connections. For example, repository 208 may communicate over a wired connection that includes a serial cable, a fiber optic cable, a CAT5 cable, or any other form of wired connection. Similarly, repository 208 may communicate via a wireless connection (e.g., via WiFi, cellular, radio, etc.). Network 206 may also include any number of intermediary networking devices, such as routers, switches, servers, etc.

Repository 208 may be one or more electronic devices connected to network 206 configured to collect data from gaming machines 102, 204. For example, repository 208 may be a single computer, a collection of computers, or a data center. Repository 208 may include one or more data storage devices in communication with one or more processors. The data storage devices may store machine instructions that, when executed by the one or more processors, cause the one or more processors to perform the functions described with regard to repository 208. Generally, repository 208 is configured to receive and store data regarding gaming machines 102, 204 and to provide the data to a user interface (e.g., a display, a handheld device, etc.). In some cases, repository 208 may perform data analysis on the received data. For example, repository 208 may determine averages, trends, metrics, etc., for one or more of gaming machines 102, 204. Data may be sent by gaming machines 102, 204 to repository 208 in real-time (e.g., whenever a change in credits or cash occurs, whenever another type of system event occurs, etc.), periodically (e.g., every fifteen minutes, every hour, etc.), or in response to a request from repository 208.

The data received by repository 208 may include operational data. In general, operational data may be any other form of data indicative of the operational state of gaming machines 102, 204. For example, operational data may include data indicative of the number of games played on gaming machines 102, 204, the types of games played on gaming machines 102, 204, errors or alerts generated by gaming machines 102, 204, whether gaming machines 102, 204 are currently in use, etc. Repository 208 may use the received operational data to allow gaming machines 102, 204 to be monitored. Repository 208 may also provide notifications, if maintenance is required for any of gaming machines 102, 204. For example, a notification may be sent to a display (e.g., a display attached to repository 208, a display of a handheld device operated by a technician, etc.), so that an error may be corrected.

In some embodiments, the data received by repository 208 may include data related to a user's loyalty account. For example, a user of gaming machine 102 may link their loyalty account to gaming machine 102, so that she can gain loyalty points, free turns, etc., while playing gaming machine 102. A user may link his or her loyalty account to gaming machine 102 in any number of ways. For example, the user may insert a loyalty card into gaming machine 102 and/or provide biometric data to gaming machine 102 (e.g., by conducting a finger print scan, a retinal scan, etc.). In some cases, a mobile device operated by the user may provide data regarding the user's loyalty account to gaming machine 102. The mobile device may transfer data to gaming machine 102 wirelessly (e.g., via Bluetooth, WiFi, etc.), via a wired connection (e.g., via a USB cable, a docking station, etc.), via the user's body (i.e., the mobile device transmits data through the user's body and into gaming machine 102), or in another manner. Repository 208 may then associate the user's time playing gaming machine 102 with the user's loyalty account (e.g., to add loyalty points to the user's account, to provide certain rewards to the user, such as a bonus turn, etc.).

Repository 208 may provide data to gaming machines 102, 204 via network 206. For example, repository 208 may notify a user of gaming machine 102 that the user qualifies for a loyalty award, such as a free meal, a free night in a hotel, a discount, a bonus turn, and so on. In some cases, repository 208 may provide a service window to gaming machines 102, 204. For example, the service window may appear within a Flash application executed by gaming machines 102, 204 via the lower display of the machines. A service window may allow notifications to be provided by repository 208 to an individual user during game play.

Figure 3A:
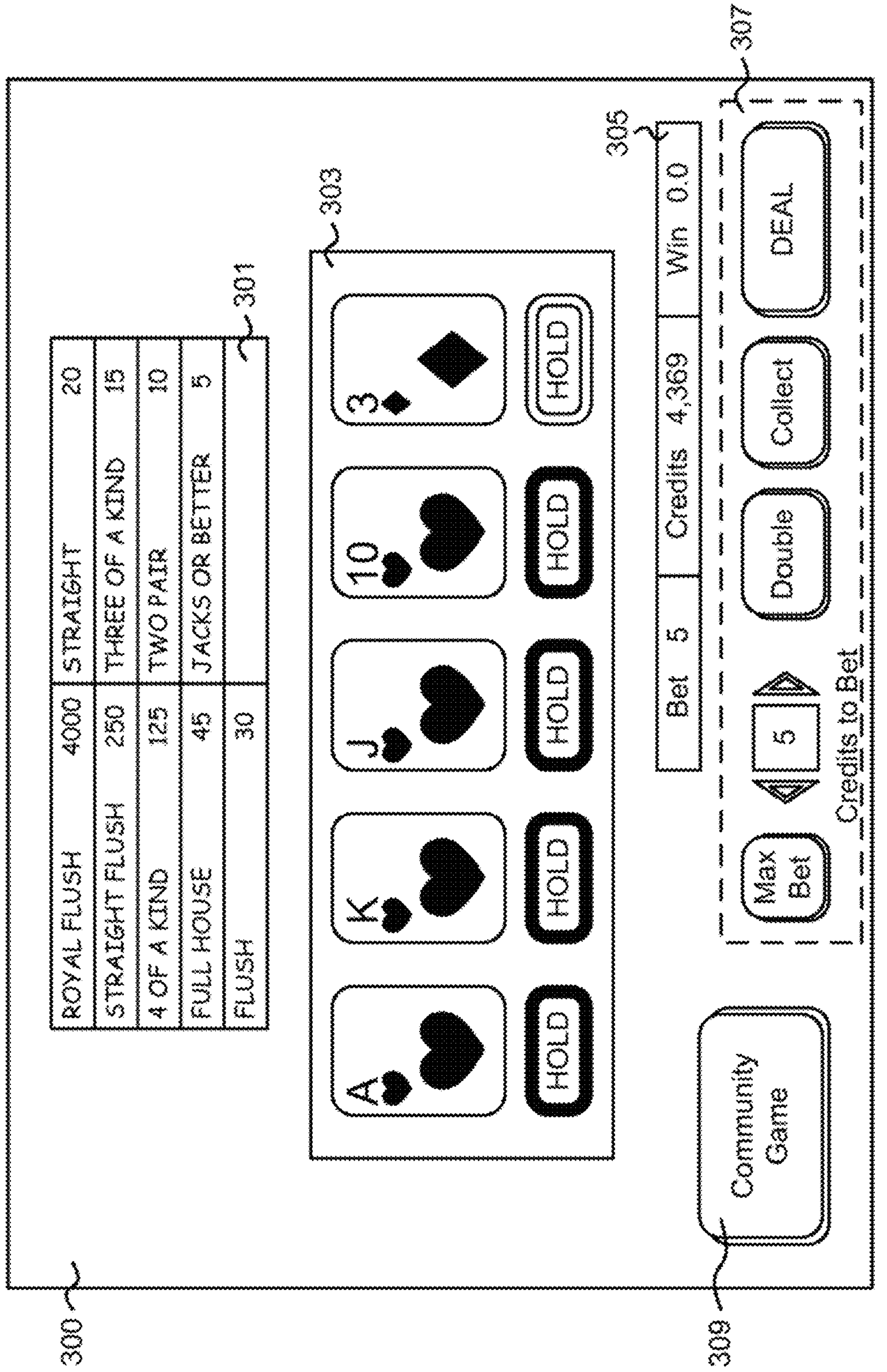
FIG. 3A is an illustration of a display of a wagering game to a first player, according to an exemplary embodiment.
Figure 3B:
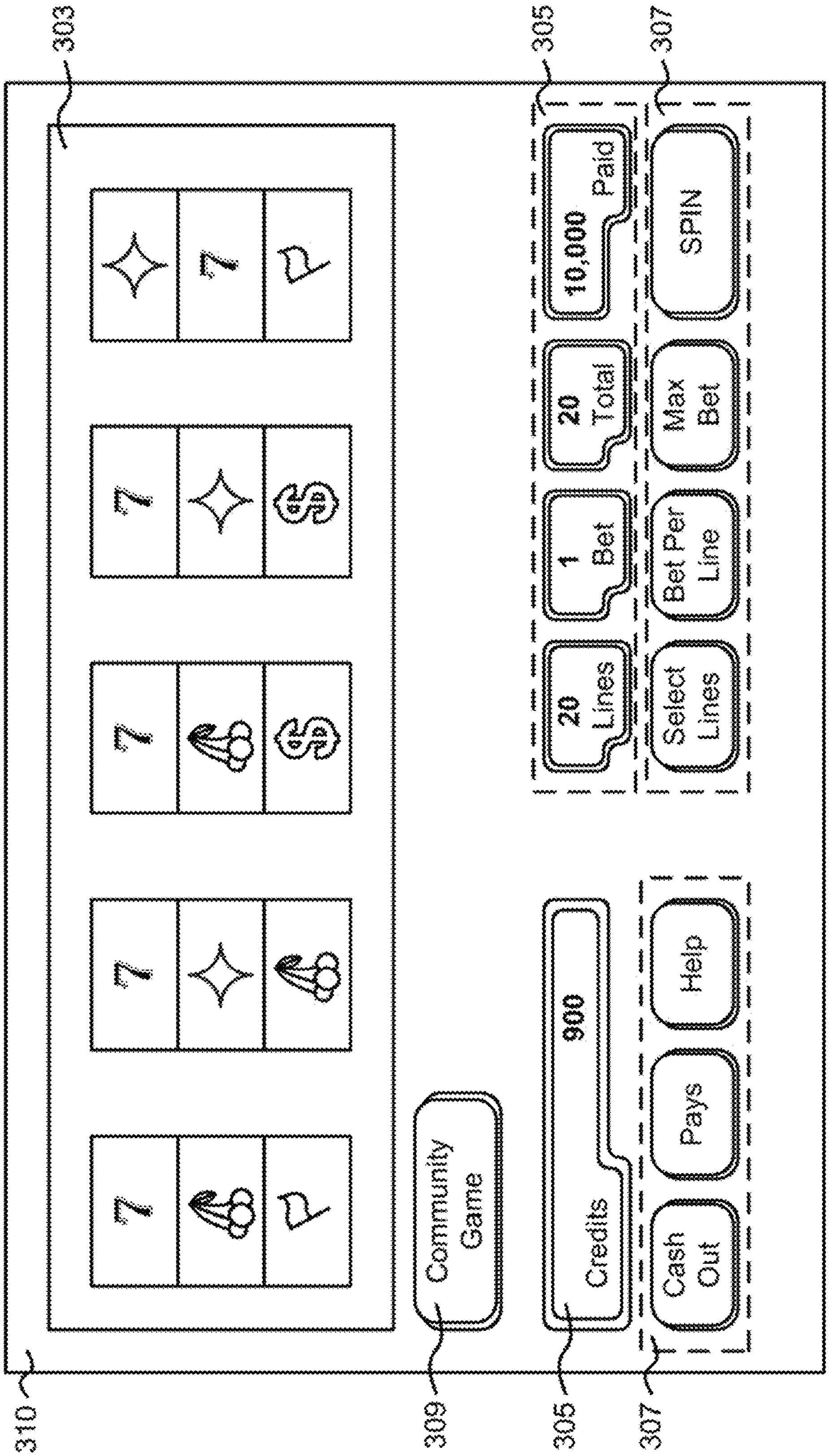
FIG. 3B is an illustration of a display of a losing game outcome to a second player of the wagering game in FIG. 3A, according to an exemplary embodiment.

FIGS. 3A and 3B are illustrations of a display screen of a wagering game to a first player, in accordance with an exemplary embodiment. The gaming machine may include display screen 300, 310 for providing the wagering game. Display screen 300, 310 may be provided on an interface of a gaming machine, a video terminal, kiosk, etc.

In another implementation, display screen 300, 310 may include a pop-up screen, picture-in-picture (PIP), an overlay, or any appropriate secondary display screen of the first player's wagering game along with a secondary display.

Display screens 300, 310 may include section 301, which includes the credits/awards won for various achievements within the game. For example, display screens 300 includes a poker wagering game, thus section 301 relates to the awards received for various card arrangements. Display screen 310 includes a slot wagering game, thus section 301 relates to awards received for various slot arrangements.

Display screen 300 may also include section 305, which includes statistics for the player. For example, section 305 may include indicators (e.g., tactile, touch screen, overlay, etc.) for the number of wagers that have been placed, how many credits the player has, the percentage of wins, and so forth. Section 305 may include more or less indicators depending on the configuration of the gaming machine.

Display screen 300 may include section 307, which includes actions that the player can take within the game. For example, section 307 includes indicators (e.g., tactile, touch screen, overlay, etc.) for the maximum wager, the number of credits needed to wager, or whether to double the bet, whether to collect any awards, whether to deal/wager, and so forth. Section 307 may include more or less indicators depending on the configuration of the gaming machine.

Display screen 300 may also include section 303, which includes the current status of the game to the player. Section 303 displays the player's current card arrangement. As shown in FIG. 3A, section 303 illustrates the final current card arrangement to the first player. In FIG. 3B, section 303 illustrates the final slot arrangement to the first player. In FIG. 3A, the first player has received a hand of four cards in sequence, all of the same suit and one card that is not of the same suit. In FIG. 3B, the first player has received four 7 symbols on the five reel gaming machine. Thus, the first player has encountered a near-miss situation.

The first player may be presented with the community gaming option interface 309. Community gaming option interface 309 may include an indicator on the gaming machine, a touch screen input, overlay (pop-up screen), etc. Community gaming option interface 309 may be configured to receive input indicating whether the first player wants to proceed to a community gaming mode to play for the community award. If the first player does not select the community gaming option, then the first player may continue to play at the gaming machine or discontinue play (e.g., cash out). In other implementations, the community gaming mode is entered automatically (without player input) responsive to the near-miss situation in the gaming results. In such implementations, the first player may decline to participate in the community gaming option, e.g., by declining to place a wager.

If the community gaming option mode is entered, then an additional wager may be required. For example, on a quarter video poker machine with a $1.25 maximum wager, an additional quarter may be required to participate in community gaming, thereby making the total wager $1.50. For example, on a penny slot machine, an additional penny may be required to participate in the community gaming. In some implementations, the jackpot for community gaming grows increases until a gaming machine receives a near-miss. For example, a percentage of coin-in may be contributed toward a community gaming pot.

If the first player elects to participate in the community gaming award, then the first player may place a wager. The first player may also be notified on display screen 300, 310 whether a second player participates in the community gaming option. In an example embodiment, each of the players that participate in the community gaming option place a wager of the same amount. For example, the amount of the wager may be an established/default wager amount for participating in the community gaming option. In other embodiments, the players may place wagers of different amounts.

In some implementations, the first player may be designated as "host," while the second player may be designated as "guest" on their respective display screens. The second player display screen is shown in FIGS. 4A and 4B.

Figure 4A:
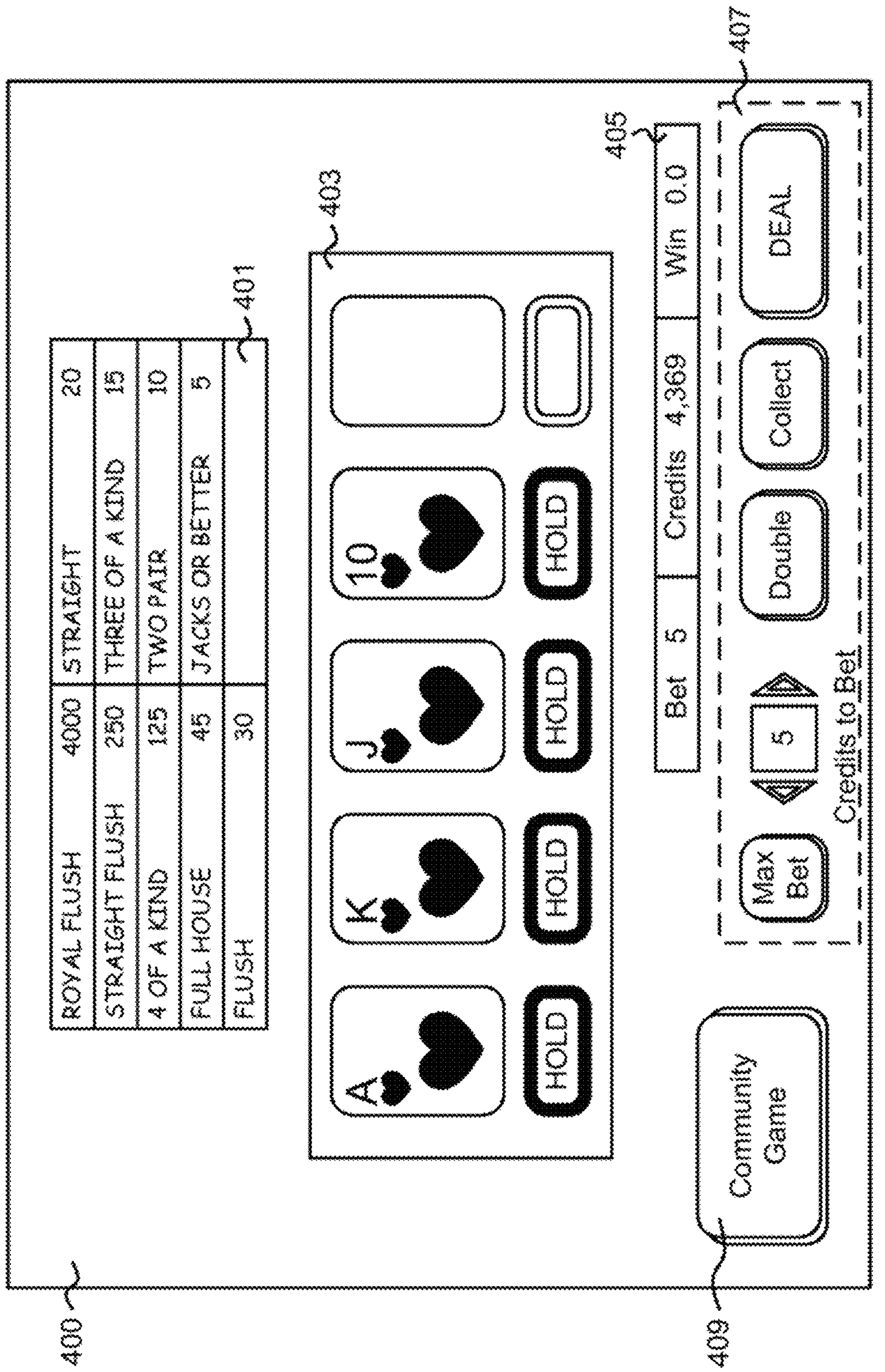
FIG. 4A is an illustration of a display of another wagering game to a first player, according to an exemplary embodiment.
Figure 4B:
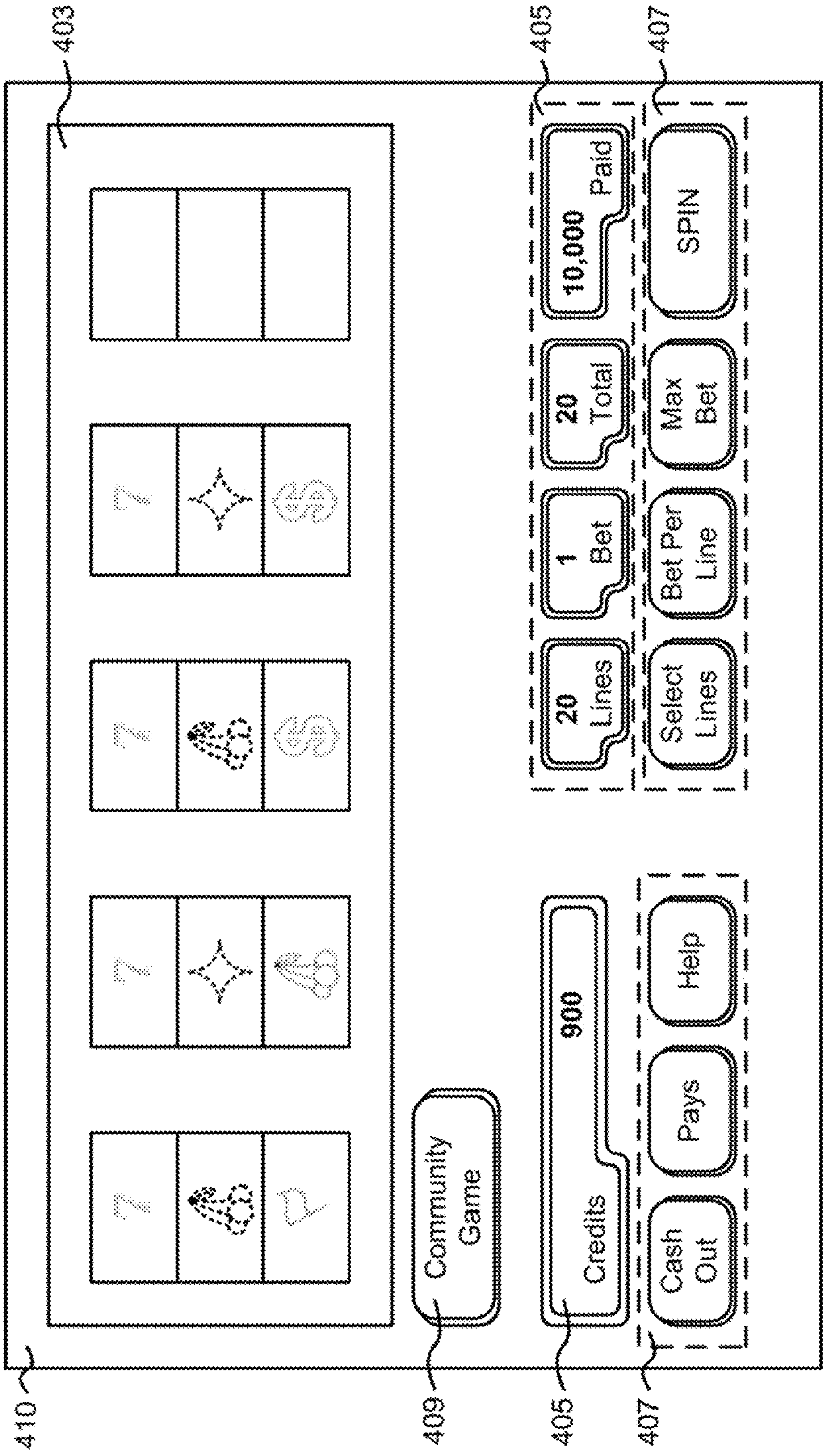
FIG. 4B is an illustration of a display of a losing game outcome to a second player of the wagering game in FIG. 4A, according to an exemplary embodiment.

In FIGS. 4A and 4B, the second player has selected via community gaming option interface 409 to play for the community award. FIGS. 4A and 4B illustrates a display screen of a second player after the first player has made their selection for the community gaming option.

FIGS. 4A and 4B are similar display screens to FIGS. 3A and 3B, showing the overlay of the community game. Display screen 400, 410 may include sections 403, 405, and 407. In alternative implementations, display screen 400, 410 may include additional or fewer elements, a different game, etc. Display screen 410 may also include community gaming option interface/selector 409. Community gaming option selector 409 may alert the second player that the first player has requested community play. For example, if community gaming option interface 409 is a selector, it may remain off (dark) until the first player selects community gaming option interface 309 on their display screen 300, then the selector powers on, flashes, lights up, etc. The second player may select community play.

Display screen 410 illustrates the first player's game (display screen 300), such as the second player's display screen 410 switches to the first player's display screen 300. In another implementation, display screen 410 may be a pop-up screen, picture-in-picture (PIP), an overlay, or any appropriate secondary display screen of the first player's wagering game within the second player's wagering game.

In some implementations, the second player may be presented with the first player's combination of cards, symbols, etc. For example, the deck of cards, slot reels, etc. may be different on the second player's gaming machine, but the display screen may include the same initial cards, symbols, etc. as the first player's display screen. In other implementations, the second player may be presented with only some of the losing cards, symbols, etc. In another implementation, the second player may be presented with an empty slot, meaning the second player is not presented with the entire losing combination. For example, in some implementations, the second player is presented with an image of the first player's screen (display screen 300, 310) and the reel without the winning symbol to spin, the card that was not part of the combination (such as the fifth card), etc.

For example, when the first player elects community gaming and the second player accepts, then display screen 300, 310, 400, 410 stops, freezes, etc. and switches to a community gaming screen, which may appear as an overlay to the main screen to announce the community game. The community gaming screen may be in a different color, light, etc.

In one example, the four cards (shown in display screen 300) that the first player held may be displayed to the second player. Display screen 400 shows that the four cards are held. Display screen 400 may display shuffling of 1 of 5, 2 of 5, etc. up to 5 of 5, at which point the card may be picked. The second player may have the option to select the card at any time and at any shuffle by pressing an indicator included in section 407, "stop" or any appropriate notification to the second user to terminate shuffling and select a card. The shuffling may be performed using a number of methodologies. For example, when the four cards are displayed, then the fifth card is randomly selected, i.e., the shuffling and selection are fake. In another example, when the four cards are displayed, then the fifth card may be selected from a real fandom shuffle and the second player terminates the random shuffling.

If the second player hits the royal flush, then the screen will display the amount WON at display screen 400. The number of players participating and the numbers of winners with amounts may also be displayed. If the second player does not hit the royal flush, then display screen 400 may include the number of players participating and the number of winners with the amounts.

Distribution of the award may be displayed to both the first player and the second player when each player accesses community gaming option interface 309. In some implementations, the award will be distributed to the first player based on their hand, symbols, etc. For example, if the first player received the hand as shown in FIG. 3A, the first player may receive 50% of the award as a consequence of being the initiator of the community gaming option. Assuming the second player wins the community gaming option, then the additional 50% may be received by the second player. If there are additional players, then the additional 50% may be equally distributed. If the first player is among the players that win the community gaming option, then the first player may be among the additional players to whom the additional 50% is equally distributed. In one implementation, if the first player is the only player to win the community gaming option, then the first player receives 100% of the award. In many games, a progressive jackpot may also be awarded in certain scenarios. If the game is one which includes a progressive jackpot, then the first player may also win the progressive jackpot in addition to winning some or all of the additional 50% of the community gaming award. After the community gaming award is distributed, the community gaming award will be reset to an established minimum. If none of the players receive a winning hand, symbols, etc., then the award increases with as a result of the additional wagers.

The community gaming award may be implemented in a variety of different ways. In one example, the award may begin at $1,000 and may typically get paid around $1,200. In some implementations, a portion of each wager, hand, etc. may be apportioned to the award. For example, if one cent is apportioned to the award, then it would take 2000 wagers, hands, etc. to add $200 to the award. If less is apportioned, then more wagers, hands, etc. may be required.

The community gaming award may be a bonus on top of the main award and any progressive jackpots. For example, a wager may be 25 cents per wager, hand, etc. which may contribute $1,000 for 4000 wagers, hands, etc. played. If the community gaming award is set as a bonus, then 20 cents of the wager may go to the main award, and 5 cents to the community gaming award. In such case, the main award would be at $1800 (for 4000 wagers) and the community gaming award may include $1200, which may attract more players to play and contribute to the community gaming award. In another example, a portion of each wager may also be allocated to a progressive jackpot.

The hit frequency may also increase the community gaming award. For example, if a royal flush gets hit every 40,000 hands, then ten players will have a frequency of hitting the main award of $1800 every 4,000 hands.

In another example, the 4 reels (shown in display screen 310) that the first player held may be displayed to the second player. Display screen 410 shows that four of the five reels are held. The second player may have the option to spin the reel at any time.

If the second player receives a winning combination coupled with the four held slot combinations, then the screen will display the amount WON at display screen 410. The number of players participating and the numbers of winners with amounts may also be displayed. If the second player does not receive a winning combination, then display screen 410 may include the number of players participating and the number of winners with the amounts.

To prevent collusion, cheating, etc. a timer may be implemented, which may be set to allows the quickest player to participate in the community game. The timer may be displayed on each gaming machine, using lights, a countdown, etc.

Figure 5:
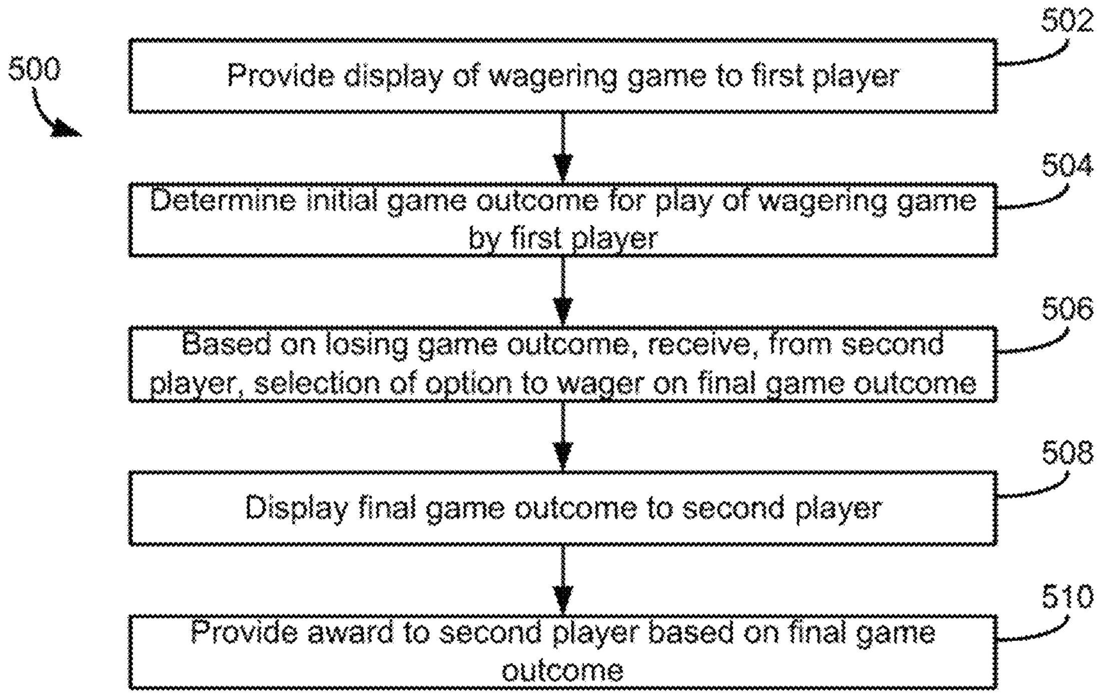
FIG. 5 is a flow diagram of a method for providing a community gaming experience at a gaming machine.

Referring now to FIG. 5, a flow diagram of a process 500 for providing a community gaming experience at a gaming machine, according to an exemplary embodiment. Process 500 may be implemented by one or more processors executing machine instructions stored within one or more computer storage devices. For example, process 500 may be implemented by a gaming machine, such as gaming machine 102 shown in FIGS. 1 and 2.

Process 500 includes providing, via a first interface at a first gaming machine, a display of a wagering game to a first player. The interface may include a text command interface, a graphical user interface, etc. The interface may show representations of various images to the player and may receive input from the user. For example, the interface may include a touch screen display, so that the player may press the images to interact with them on the display. In some implementations, input to the interface may be provided using a trackball, mouse, keyboard, etc.

Process 500 includes determining an initial game outcome for a play of the wagering game by the first player (block 504). The wagering game may include a slot wagering game, a poker wagering game, a blackjack wagering game, a keno wagering game, a baccarat wagering game, and a bingo wagering game. The play may include a wager. The wager may further include items, awards, credits, etc. The initial game outcome may include the losing game outcome.

Process 500 includes, based on the losing game outcome by the first player, receiving, from a second player, a selection of an option to wager on a final game outcome (block 506). The final game outcome may be based in part on the losing game outcome. The selection of the option to wager on the final game outcome may include receiving permission from the first player. In some implementations, the second player may place an initial wager to receive the selection of the option to wager on the final game outcome. In other implementations, the first player selects the second player to wager on the final game outcome. In other implementations, the selection of the option to wager on the final game outcome is provided to the second player based on a player profile of the second player. For example, a player loyalty account may permit a second player to wager x amount of times. The selection of the option to wager on the losing game outcome is provided to the second player in the form of an icon, an image, etc. The selection of the option to wager on the final game outcome may be provided to the second player based on an elapsed time from a previous wager. For example, the second play may wait a predetermined amount of time from a first wager on the second player's machine before being able to wager on the first player's losing game outcome.

Process 500 also includes displaying the final game outcome to the second player via a second interface at a second gaming machine (block 508). Process 500 includes providing an award to the second player based on the final game outcome. An award may also be provided to the first player. The award may be shared between the first and the second player based on each player's respective wager.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

The invention is claimed as follows:

1. A method of operating an electronic gaming machine, the method comprising:

following a receipt, via a network interface and from a networked repository, of data associated with a final first game outcome from a completed play of a game associated with a first player remote from the electronic gaming machine, following displaying, by a display device of the electronic gaming machine, of the final first game outcome from the completed play of the game associated with the first player and responsive to receiving at least one input made, via an input device of the electronic gaming machine in association with a community gaming option interface that is enabled when the electronic gaming machine is operating in a community gaming mode and disabled when the electronic gaming machine is operating separate from the community gaming mode, by a second, different player to place a wager in association with the final first game outcome from the completed play of the game associated with the first player:

displaying, by the display device of the electronic gaming machine, a second game outcome, wherein the displayed second game outcome is based, at least in part, on the final first game outcome from the completed play of the game associated with the first player and includes at least a portion of that final first game outcome, and displaying, by the display device of the electronic gaming machine, any award associated with the displayed second game outcome including at least the portion of the final first game outcome from the completed play of the game associated with the first player.

2. The method of claim 1, wherein the final first game outcome is a losing game outcome.

3. The method of claim 2, wherein the losing game outcome is a near-miss losing game outcome.

4. The method of claim 1, wherein at least a first portion of any award associated with the displayed second game outcome is available to the first player.

5. The method of claim 1, wherein the portion of the final first game outcome included in the displayed second game outcome includes at least one playing card from the final first game outcome.

6. The method of claim 1, wherein the play of the game is one of: a play of a slot game, a play of a poker game, a play of a blackjack game, a play of a keno game, a play of a baccarat game, and a play of a bingo game.

7. A method of operating a gaming system server, the method comprising:

following a receipt, from a first electronic gaming machine, of data associated with a final first game outcome from a completed play of a game associated with a first player at the first electronic gaming machine, following a communication of data to a different, second electronic gaming machine that results in a display, by at least one display device of the second electronic gaming machine, of the final first game outcome from the completed play of the game associated with the first player at the first electronic gaming machine and responsive to a receipt, from the second electronic gaming machine, of data associated with at least one input made, via an input device of the second electronic gaming machine and in association with a community gaming option interface that is enabled when the second electronic gaming machine is operating in a community gaming mode and disabled when the second electronic gaming machine is operating separate from the community gaming mode, by a second, different player at the second electronic gaming machine to place a wager in association with the final first game outcome from the completed play of the game:

displaying, by the at least one display device of the second electronic gaming machine, a second game outcome, wherein the displayed second game outcome is based, at least in part, on the final first game outcome from the completed play of the game associated with the first player at the first electronic gaming machine and includes at least a portion of that final first game outcome, and displaying, by the at least one display device of the second electronic gaming machine, any award associated with the displayed second game outcome including at least the portion of the final first game outcome from the completed play of the game associated with the first player at the first electronic gaming machine.

8. The method of claim 7, wherein the final first game outcome is a losing game outcome.

9. The method of claim 8, wherein the losing game outcome is a near-miss losing game outcome.

10. The method of claim 7, wherein at least a first portion of any award associated with the displayed second game outcome is available to the first player.

11. The method of claim 7, wherein the portion of the final first game outcome included in the displayed second game outcome includes at least one playing card from the final first game outcome.

12. The method of claim 7, wherein the play of the game is one of: a play of a slot game, a play of a poker game, a play of a blackjack game, a play of a keno game, a play of a baccarat game, and a play of a bingo game.

* * * * *